(12) United States Patent
Steigerwald et al.

(10) Patent No.: US 11,123,825 B2
(45) Date of Patent: Sep. 21, 2021

(54) COPPER-BASED BRAZING MATERIAL AND USE OF THE BRAZING MATERIAL

(71) Applicant: Faurecia Emissions Control Technologies, Germany GmbH, Augsburg (DE)

(72) Inventors: Marc Steigerwald, Augsburg (DE); Simon Burger, Augsburg (DE); Yasir Muhammad, Gablingen (DE); Helmut Wieser, Aichach (DE)

(73) Assignee: Faurecia Emissions Control Technologies, Germany GmbH

( * ) Notice: Subject to any disclaimer, the term of this patent is extended or adjusted under 35 U.S.C. 154(b) by 0 days.

(21) Appl. No.: 15/678,185

(22) Filed: Aug. 16, 2017

(65) Prior Publication Data

US 2018/0056452 A1    Mar. 1, 2018

(30) Foreign Application Priority Data

Aug. 31, 2016 (DE) .................... 102016116265.5

(51) Int. Cl.
| | |
|---|---|
| B23K 35/30 | (2006.01) |
| B23K 1/002 | (2006.01) |
| B23K 1/19 | (2006.01) |
| B23K 35/02 | (2006.01) |
| C22C 9/06 | (2006.01) |
| B23K 103/02 | (2006.01) |

(52) U.S. Cl.
CPC ............ *B23K 35/302* (2013.01); *B23K 1/002* (2013.01); *B23K 1/19* (2013.01); *B23K 35/0227* (2013.01); *B23K 35/0233* (2013.01); *C22C 9/06* (2013.01); *B23K 2103/02* (2018.08)

(58) Field of Classification Search
CPC ...... B23K 1/002; B23K 1/19; B23K 35/0227; B23K 35/0233; B23K 35/302; C22C 9/06
See application file for complete search history.

(56) References Cited

U.S. PATENT DOCUMENTS

| | | | | |
|---|---|---|---|---|
| 1,338,518 A * | 4/1920 | Milliken | .................... | C22C 9/06 420/481 |
| 1,350,166 A * | 8/1920 | Milliken | .................... | C22C 9/06 420/481 |
| 1,525,047 A * | 2/1925 | Rath | .......................... | C22C 9/06 420/487 |
| 1,906,567 A * | 5/1933 | Fritschle | ................... | C22C 9/06 420/479 |
| 1,983,205 A * | 12/1934 | Wilkins | .................... | C22C 9/06 420/481 |
| 3,006,757 A * | 10/1961 | Hoppin | ................ | B23K 35/302 228/262.31 |
| 3,693,246 A * | 9/1972 | Novikov | .............. | B23K 35/302 228/234.1 |
| 3,772,092 A * | 11/1973 | Shapiro | ..................... | C22C 9/05 148/413 |
| 3,824,135 A * | 7/1974 | Pryor et al. | ............... | C22C 9/06 148/413 |
| 4,003,715 A * | 1/1977 | Cascone | .............. | B23K 35/302 219/146.32 |
| 4,426,033 A * | 1/1984 | Mizuhara | ............. | B23K 35/302 228/124.5 |
| 4,684,052 A * | 8/1987 | McDonald | ........... | B23K 35/302 228/122.1 |
| 4,879,094 A * | 11/1989 | Rushton | .................... | C22C 9/04 420/476 |
| 4,911,351 A * | 3/1990 | Ishikawa | .................. | B23K 1/20 228/183 |
| 4,913,752 A | 4/1990 | Falk | | |
| 6,059,901 A * | 5/2000 | Sahu | ......................... | C22C 9/04 148/433 |
| 6,413,651 B1 * | 7/2002 | Yan | ........................ | B23K 20/04 228/194 |
| 6,605,371 B1 * | 8/2003 | Ueda | .................... | B23K 35/302 148/426 |
| 8,008,535 B2 * | 8/2011 | Waycuilis | .............. | C10G 29/02 585/408 |
| 2014/0037986 A1 | 2/2014 | Weinstein et al. | | |
| 2016/0158898 A1 * | 6/2016 | Wiehl | .................... | B23K 35/28 148/528 |

(Continued)

FOREIGN PATENT DOCUMENTS

| | | | |
|---|---|---|---|
| DE | 764815 | * | 5/1954 |
| DE | 764815 | | 7/1954 |

(Continued)

OTHER PUBLICATIONS

English summary of the German office action dated Aug. 31, 2016.

*Primary Examiner* — Erin B Saad
*Assistant Examiner* — Carlos J Gamino
(74) *Attorney, Agent, or Firm* — Carlson, Gaskey & Olds, P.C.

(57) ABSTRACT

A copper-based brazing material comprises an alloy having nickel in a proportion of from 20 to 35 percent by weight, zinc in a proportion of from 5 to 20 percent by weight, manganese in a proportion of from 5 to 20 percent by weight, chromium in a proportion of from 1 to 10 percent by weight, silicon in a proportion of from 0.1 to 5 percent by weight and molybdenum in a proportion of from 0 to 7 percent by weight, each based on the total weight of the alloy, and the remainder being copper and unavoidable impurities. The alloy is in particular free from boron, phosphorus and lead. The brazing material can be used for induction brazing of components made of iron materials for exhaust systems in motor vehicles.

12 Claims, No Drawings

(56) References Cited

U.S. PATENT DOCUMENTS

| | | | | |
|---|---|---|---|---|
| 2016/0349704 A1* | 12/2016 | Charbon | .................... | C22C 9/06 |
| 2017/0349975 A1* | 12/2017 | Laws | ....................... | C22C 45/00 |
| 2018/0209441 A1* | 7/2018 | Yacobucci | ............... | C22C 38/04 |
| 2018/0236611 A1* | 8/2018 | Bornegard | .......... | B23K 35/0244 |

FOREIGN PATENT DOCUMENTS

| | | | | | |
|---|---|---|---|---|---|
| DE | 1092218 | A | | 11/1960 | |
| DE | 106970 | | | 7/1974 | |
| DE | 2459971 | A1 | * | 6/1975 | |
| DE | 102009059686 | | | 6/2011 | |
| EP | 1036628 | | | 9/2000 | |
| EP | 1036628 | A1 | | 9/2000 | |
| GB | 1444521 | A | * | 8/1976 | ........... B23K 35/302 |
| GB | 1462662 | A | * | 1/1977 | ........... B23K 35/302 |
| JP | 05-041096 | A | * | 4/1981 | |
| JP | 5641096 | A | * | 4/1981 | ........... B23K 35/302 |
| JP | H0195894 | | | 4/1989 | |
| WO | 8606751 | A1 | | 11/1986 | |
| WO | 0105585 | A1 | | 1/2001 | |

* cited by examiner

COPPER-BASED BRAZING MATERIAL AND USE OF THE BRAZING MATERIAL

CROSS-REFERENCE TO RELATED APPLICATIONS

This application claims priority to DE 10 2016 116 265.5, filed Aug. 31, 2016.

FIELD OF THE INVENTION

The invention relates to a copper-based brazing material and its use for brazing of metallic components. In particular, the invention relates to a brazing material with high resistance to oxidation and corrosion for use in induction brazing of components made of iron materials, preferably stainless steel, for exhaust systems in motor vehicles.

BACKGROUND

Components for exhaust systems are usually joined by arc welding. Due to the advancing development towards lightweight design, increasingly more components having a low wall thickness have to be joined in which the common arc welding method cannot be used any longer. Thus, alternative joining methods have to be used.

One of these methods is induction brazing. As opposed to other brazing methods, induction brazing has the advantage that the heating phase can be performed locally and with great speed and good reproducibility. Therefore, induction brazing is very suitable for automated production.

However, there are high requirements with regard to the quality of the brazed joint, in particular for exhaust systems of motor vehicles. The brazing material used has to guarantee sufficient wetting of the substrate's surface and gap filling during the brazing process. In addition, the brazed joint has to exhibit sufficient high-temperature resistance and oxidation resistance under harsh environmental conditions and has to be resistant to thermal cycling without any crack formation. Basically, these requirements can be met by nickel-based brazing materials.

However, nickel braze alloys for the joining of iron-base materials with additions of silicon, phosphorus and boron can only be produced as powders or amorphous thin films, as they are poorly moldable. When used as brazing materials, nickel-base alloys present as amorphous films can only be processed with great efforts and are only limitedly eligible for automated induction brazing. Copper alloys can be provided in the form of wires or films. Pure copper shows excellent wetting of metallic surfaces. However, the oxidation resistance of copper at high temperatures is not sufficient for use in exhaust systems. Although the oxidation resistance of copper can be improved by adding alloy elements such as aluminium or silicon, addition of these elements impairs both wetting behaviour and deformability. Thus, commercial copper alloys such as $CuAl_5$ with good oxidation resistance are unsuitable as brazing material for induction brazing. In addition, the difference in potential between copper and stainless steel promotes the occurrence of corrosion at the interfaces of the brazed joint.

From EP 1036628A1 braze alloys are known that essentially consist of manganese, nickel and copper and are processed by stacking a manganese-containing base layer made of a Mn—Ni alloy or a Mn—Ni copper alloy, and a nickel-containing metallic layer made of nickel, a nickel alloy or a nickel-copper alloy, on top of each other and bonding them. The composite material thus obtained can be used for brazing of stainless steel components with join partners made of iron or steel.

JP-01-095894A describes a copper-based brazing material with proportions of nickel in a range of 15 to 30 percent by weight, proportions of manganese in a range of 5 to 15 percent by weight, proportions of silicon in a range of 0.5 to 3 percent by weight, proportions of boron in a range of 0.5 to 1.5 percent by weight and the remainder being copper as well as unavoidable impurities. This material is used for simultaneous sintering and brazing of an iron sintering alloy.

SUMMARY

There is still the need for brazing materials with high resistance to oxidation and thermal cycling that are suitable for induction brazing of components for exhaust systems.

According to the present invention, this object is solved by a brazing material as described below.

Advantageous embodiments are stated in the claims, which can optionally be combined with each other.

According to the present invention, a copper-based brazing material is provided that comprises an alloy having nickel in a proportion of from 20 to 35 percent by weight, zinc in a proportion of from 5 to 20 percent by weight, manganese in a proportion of from 5 to 20 percent by weight, chromium in a proportion of from 1 to 10 percent by weight, silicon in a proportion of from 0.1 to 5 percent by weight, and molybdenum in a proportion of from 0 to 7 percent by weight, each based on the total weight of the alloy, and the remainder being copper and unavoidable impurities. The alloy is in particular free from boron, phosphorus and lead.

The invention is based on the finding that brazing materials eligible for induction brazing can be provided by combining the advantageous properties of copper alloys with the corrosion resistance of nickel alloys, which, in addition, exhibit sufficient deformability to allow for the production of films or wires from the brazing material.

At the same time, the brazing materials of the present invention also meet the requirements with regard to the joining of components for the production of exhaust systems, for example good oxidation resistance and corrosion resistance, sufficient strength of the brazed joint at temperatures of up to 800° Celsius, and good wetting behaviour during brazing of iron materials, in particular stainless steel.

In addition, the brazing materials of the present invention are characterized by a processing temperature of preferably not more than 1,200° C. and/or a melting temperature of not more than 1,150° C. (liquidus), thus allowing for the processing of the brazing material at temperatures far below those required for nickel alloys. Exceeding this temperature in the brazing process can cause excessive grain growth and thus an undesired change of the grain structure in the base material.

All of these properties can be achieved by the brazing material of the present invention. To this end, the invention is based on a copper-nickel alloy whose melting point is lowered by further alloy additions and whose oxidation resistance with regard to the use in exhaust systems is improved.

Addition of zinc in proportions of from 5 to 20 percent by weight reduces the melting point of the brazing material. Below a zinc content of 5 percent by weight no appreciable impact on the melting point of the brazing material can be observed. As zinc itself has a low melting point and a low boiling temperature, a strong decrease in the zinc content can be detected during the brazing process at high temperatures. In addition, the outgassing of zinc from the brazing material during the brazing process improves the wetting behaviour of the brazing material during induction brazing as the zinc vapour displaces the reactive oxygen present in the direct environment of the brazing zone. Due to the outgassing of zinc from the brazing material during the brazing process, the final zinc content in the brazed joint is lower than the zinc content in the brazing material. Thus, the brazed joint has a higher melting point and also an improved resistance to high temperatures. When exceeding a zinc content of 20 percent by weight in the brazing material, an undesired phase separation can occur during cooling of the brazed joint. Thus, according to the present invention, the zinc content in the brazing material is limited to not more than 20 percent by weight.

The zinc content of the brazing material is preferably in a range of 5 to 15 percent by weight, particularly preferably of 5 to 12 percent by weight.

Addition of manganese also leads to a reduction of the alloy's melting point and improves the wetting behaviour. As addition of manganese can impair the oxidation resistance, the manganese content, according to the present invention, is limited to not more than 20 percent by weight.

According to a preferred embodiment, the brazing material has a manganese content in a range of 5 to 20 percent by weight, preferably of 7 to 19 percent by weight, particularly preferably of 8 to 18 percent by weight.

Addition of chromium improves the corrosion resistance of the brazing material, with a chromium content of less than 1 percent by weight showing no considerable effect. However, high chromium contents bring about an increase in the melting point. Thus, according to the present invention, addition of chromium is in a range between 1 and 10 percent by weight.

The chromium content of the brazing material of the present invention is preferably from 3 to 10 percent by weight, particularly preferably from 4 to 10 percent by weight.

Addition of silicon serves to improve the high-temperature resistance of the brazing material. Starting from an addition of 0.1 percent by weight of silicon, the wetting behaviour of the melted solder and the adhesion to the base material are improved. As silicon easily forms intermetallic phases with other elements, addition of silicon, according to the present invention, is limited to not more than 5 percent by weight. Addition of silicon can also lower the melting point of the brazing material.

In the brazing material of the present invention, silicon is preferably present in a proportion of from 0.1 to 3 percent by weight, particularly preferably in a proportion of from 0.2 to 1 percent by weight.

According to a preferred embodiment, the brazing material of the present invention contains molybdenum in proportions of from 0.1 to 7 percent by weight. Addition of molybdenum improves the oxidation resistance. By forming a strongly adhesive oxide layer, molybdenum can protect the brazed joint underneath the oxide layer from decomposing and being attacked by corrosion. Moreover, addition of molybdenum influences the formation of intermetallic phases of silicon and the other alloy additions. As molybdenum contained in copper tends to segregate and also increases the melting point of the brazing material, addition of molybdenum is limited to not more than 7 percent by weight.

Preferably, the molybdenum content of the brazing material is in a range of 0.5 to 2 percent by weight.

The brazing material of the present invention is also free from additions of boron, phosphorus and lead. Using none of these alloy additions improves the ductility and deformability of the brazing material. Thus, the brazing material can be easily provided in the form of wires and films to be used in automated induction brazing. In addition, this avoids an embrittlement of the iron-base material caused by the diffusion of boron and phosphorus.

In particular, the brazing material consists of the copper-nickel alloy and the alloy additions of Zn, Mn, Cr, Si and optionally Mo.

The nickel content of the brazing material is preferably in a range of 25 to 35 percent by weight, particularly preferably in a range of 25 to 30 percent by weight, each based on the total weight of the brazing material. Although high nickel contents of more than 30 percent by weight can further improve the corrosion resistance of the brazing material, the melting point of the brazing alloy has to be reduced by increased additions of zinc, manganese and silicon.

The brazing material of the present invention has preferably a processing temperature of not more than 1,200° Celsius and a melting point (liquidus) of not more than 1,150° Celsius.

Preferably, the liquidus temperature of the brazing material is in a range of 1,050° Celsius to 1,150° Celsius.

The brazing material of the present invention is suitable for use in induction brazing of components made of iron materials, preferably stainless steel, for exhaust systems in motor vehicles.

Preferably, induction brazing is performed at a processing temperature of the brazing material of not more than 1,200° C.

DETAILED DESCRIPTION

Further characteristics and advantages of the present invention can be inferred from the following description of preferred embodiments, which, however, shall not be considered as limiting.

Manufacturing Example

To produce a brazing material of the present invention, metal powders are mixed in the proportions mentioned below and melted in a melting furnace:

48.5 percent by weight copper
28 percent by weight nickel
10 percent by weight zinc
8 percent by weight manganese
5 percent by weight chromium
0.5 percent by weight silicon.

The melt was cast into a block and subsequently formed into a wire by hot rolling.

Test Results

The brazing material thus obtained was subjected to the following tests:
Wetting Wetting tests were performed at a conductive test stand under a controlled, low-oxygen atmosphere. A defined amount of brazing material was applied to a metal strip that is heated to the processing temperature over a short period of time by applying power. During heating and maintaining at the processing temperature, the solder wets the metallic surface and spreads. At the solder/metal phase boundary a specific contact angle occurs. The lower the contact angle, the better the wetting of the metallic surface by the solder. The contact angle was measured using a 3D microscope and a perpendicular metallographic microsection of the wetting plane.

Salt Spray Test

To simulate the corrosive attack against the brazed joint, pipe joints were brazed and subjected to a salt spray test. The salt spray test performed here is based on VDA621-415 and was modified as follows.

To perform the test, specimens exhibiting the brazed joints were first maintained for 3.5 hours at a temperature of 500° C. and subsequently sprayed for 4 hours at 35° C. with a saline solution (5 percent by weight NaCl in distilled water). Then the specimens were exposed for 4 hours to a changing condensation water climate between 20° C. and 40° C. and 70% and 95% humidity. Subsequently, a room climate of 20° C. and 65% humidity was simulated for 12.5 hours. This four-part treatment cycle was repeated 20 times in total. Then microsections of the specimens were analysed for corrosive patches using a light microscope.

The ageing test described corresponds to an exposure of the components of an exhaust system under normal operating conditions over a period of approximately 4 years.

Condensate Corrosion

For testing condensate corrosion, metal strips provided with solder are first maintained for 5 hours at a temperature of 500° C. Subsequently, the metal strips are exposed for 1 hour to a dry hot airflow and for 5 hours to a moist climate of 99.9% humidity at 80° C. During this time, the specimens are located above a bath containing a condensate solution of citric acid, sodium hydroxide, sodium chloride and distilled water. The cycle of hot airflow and moist climate is repeated 5 times in total. Overall, the sequence comprising heating in the furnace and 5 cycles of hot airflow and moist climate is repeated 10 times.

Evaluation is performed using metallographic microsections and a three-dimensional image of the solder surface. With the use of this test, statements can be made on the corrosion resistance of the solder to the acidic condensate. Further, galvanic corrosion between the base material and the solder occurring in the peripheral area of the surface provided with solder can be determined quantitatively.

Resistance to Oxidation

Resistance to oxidation is evaluated using a cyclic oxidation test. To this end, a specimen of the brazing material with a known surface is cyclically heated to an application-oriented temperature of 650° C. in a furnace under air atmosphere, maintained at the temperature for a pre-determined period of time, and then cooled in air. This process is repeated 20 times, with the weight change of the specimen caused by formation or flaking of the oxide layer, based on the surface in mg/mm$^2$, being continuously recorded.

Melting Interval (DSC Analysis)

To determine the melting interval, a DSC (Differential Scanning calorimetry) analysis was performed. The DSC measuring cell consists of a furnace and an integrated sensor equipped with corresponding footprints for specimen and reference crucibles. The surfaces of the sensor are linked with thermocouples or are themselves part of the thermocouples. Thus, both the temperature difference between specimen and reference sides (DSC signal) and the absolute temperature of the specimen or reference side can be determined.

Gap Filling Capacity

Pipe joints were induction-brazed under a protected atmosphere, and wetting and penetration depth of the solder into the gap at a gap width up to approximately 400 μm were measured metallographically.

Mechanical Properties (Hardness, Tensile Strength)

a) Tensile Strength

To determine the tensile strength according to DIN 50125, centrally butt-brazed shape H tensile specimens were produced conductively and tested on a test machine (universal test machine ZWICK 1485).

b) Hardness

Vickers hardness $HV_{0.1}$ was measured according to DIN EN ISO 6507-1. Microsections of the metal strips from the wetting tests that were conductively provided with solder were used as specimen material.

On sheet steel, the brazing material of the present invention with the composition Cu48.5Ni28Zn10Mn8Cr5Si0.5 exhibits a contact angle of 12° and thus a very good wetting behaviour. In a commercially available copper solder (Bedra™ M122, Berkenhoff) a contact angle of 30° occurs under the same test conditions.

In the salt spray test, no critical corrosion attack can be observed metallographically, either at the brazing material or at the phase boundary between the brazing material and the base substrate. The test for condensate corrosion shows a value for the volume wear of the brazing material of approximately 0.02 mm$^3$/mm$^2$, reaching the values obtained for traditional nickel alloys. The test for oxidation resistance shows the rapid formation of a strongly adhering oxide layer. After formation of this protective top layer only marginal weight changes can be detected. Thus, the oxidation resistance of the alloy of the present invention is sufficient for use at high temperatures, and the oxidation resistance of copper is by far exceeded.

The DSC measurement showed a melting interval from 1,050° C. (solidus) to 1,140° C. (liquidus). The tensile strength of the brazed joint was 320 N/mm$^2$ and the Vickers hardness $HV_{0.1}$ was 180.

The test results demonstrate the suitability of the brazing material of the present invention for use in induction brazing and additionally show that the brazed joint thus obtained is sufficiently resistant under the conditions prevailing in exhaust systems of motor vehicles and has the required mechanical strength and resistance to thermal cycling.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A copper-based brazing material for use in induction brazing of stainless steel, wherein the brazing material consists of an alloy having nickel in a proportion of from 25 to 30 percent by weight,
zinc in a proportion of from 5 to 20 percent by weight,
manganese in a proportion of from 5 to 20 percent by weight,
chromium in a proportion of from 1 to 10 percent by weight,
silicon in a proportion of from 0.1 to 5 percent by weight, and
molybdenum in a proportion of from 0 to 7 percent by weight, each based on the total weight of the alloy, and the remainder being copper and unavoidable impurities, wherein the alloy is free from boron, phosphorus and lead; and wherein the brazing material is present in a form of a wire or of a foil.

2. The brazing material according to claim 1, wherein the brazing material has a liquidus temperature of at most 1,150° C.

3. The brazing material according to claim 1, wherein the proportion of zinc is within a range of from 5 to 15 percent by weight.

4. The brazing material according to claim 1, wherein the proportion of manganese is within a range of from 7 to 19 percent by weight.

5. The brazing material according to claim 1, wherein the proportion of chromium is within a range of from 3 to 10 percent by weight.

6. The brazing material according to claim 1, wherein the alloy has molybdenum in a proportion of from 0.1 to 7 percent by weight.

7. The brazing material according to claim 1, wherein the brazing material has a liquidus temperature in a range of from 1,050° C. to 1,150° C.

8. The brazing material according to claim 1, wherein the proportion of silicon is within a range of from 0.3 to 1 percent by weight.

9. A copper-based brazing material for use in induction brazing of stainless steel, wherein the brazing material consists of an alloy having nickel in a proportion of 28 percent by weight,
zinc in a proportion of 10 percent by weight,
manganese in a proportion of 8 percent by weight,
chromium in a proportion of 5 percent by weight, and
silicon in a proportion of 0.5 percent by weight,
each based on the total weight of the alloy, and the remainder being copper and unavoidable impurities, wherein the alloy is free from boron, phosphorus and lead.

10. A copper-based brazing material for use in induction brazing of stainless steel, wherein the brazing material consists of an alloy having nickel in a proportion of from 25 to 30 percent by weight,
zinc in a proportion of from 5 to 12 percent by weight,
manganese in a proportion of from 8 to 18 percent by weight,
chromium in a proportion of from 4 to 10 percent by weight,
silicon in a proportion of from 0.2 to 1 percent by weight, and
molybdenum in a proportion of from 0 to 7 percent by weight, each based on the total weight of the alloy, and the remainder being copper and unavoidable impurities, wherein the alloy is free from boron, phosphorus and lead.

11. The brazing material according to claim 10, wherein the alloy has molybdenum in a proportion of from 0.5 to 2 percent by weight.

12. The brazing material according to claim 10, wherein the brazing material is present in the form of a wire or of a foil.

* * * * *